United States Patent
Aull

(10) Patent No.: US 6,941,455 B2
(45) Date of Patent: Sep. 6, 2005

(54) SYSTEM AND METHOD FOR CROSS DIRECTORY AUTHENTICATION IN A PUBLIC KEY INFRASTRUCTURE

(75) Inventor: Kenneth W. Aull, Fairfax, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 854 days.

(21) Appl. No.: 09/823,477

(22) Filed: Mar. 30, 2001

(65) Prior Publication Data

US 2002/0144111 A1 Oct. 3, 2002

Related U.S. Application Data

(60) Provisional application No. 60/229,336, filed on Sep. 1, 2000, and provisional application No. 60/210,461, filed on Jun. 9, 2000.

(51) Int. Cl.⁷ .............................. H04L 9/00
(52) U.S. Cl. .................... 713/155; 709/229
(58) Field of Search ............ 713/155–157; 705/67; 709/225, 229

(56) References Cited

U.S. PATENT DOCUMENTS

| | | |
|---|---|---|
| 5,922,074 A | 7/1999 | Richard et al. |
| 6,131,120 A * | 10/2000 | Reid ............ 709/225 |
| 6,223,291 B1 * | 4/2001 | Puhl et al. ............ 713/201 |

FOREIGN PATENT DOCUMENTS

JP      10-308733       11/1988

* cited by examiner

Primary Examiner—Andrew Caldwell
Assistant Examiner—Minh Dieu Nguyen
(74) Attorney, Agent, or Firm—Tarolli, Sundheim, Covell & Tummino L.L.P.

(57) ABSTRACT

System and method for cross directory authentication in a Public Key Infrastructure. A first directory is configured to query a second directory when receiving queries regarding signature certificates from a second enterprise PKI. The first directory is part of a first enterprise PKI, and the second directory is part of the second enterprise PKI. Access to a first enterprise PKI server is attempted by a user. The user presents a signature certificate from the second enterprise PKI to the server for authentication. A query is sent to the first directory from the server to determine if the user is allowed access to the server. A query is sent to the second directory from the first directory to determine if the user is a member of the second enterprise PKI. The server approves access to the server if the user is a member of the second enterprise PKI.

9 Claims, 3 Drawing Sheets

SYSTEM AND METHOD FOR CROSS DIRECTORY AUTHENTICATION IN A PUBLIC KEY INFRASTRUCTURE

CROSS REFERENCE TO RELATED APPLICATIONS

This application claims the benefit of U.S. Provisional Application No. 60/210,461 filed on Jun. 9, 2000, and U.S. Provisional Application No. 60/229,336 filed on Sep. 1, 2000, the contents of which are expressly incorporated by reference herein.

BACKGROUND

1. Field of the Invention

This invention relates to Public Key Infrastructures (PKI), and more specifically to cross directory authentication in a PKI.

2. Background Information

A public key infrastructure (PKI) is a collection of servers and software that enables an organization, company, or enterprise to distribute and manage thousands of unique public/private cryptographic keys in a manner that allows users to reliably determine the identity of the owner of each public/private key pair. When each member of an enterprise has a unique key, paper-based business processes may be transitioned to an online, electronic equivalent. Public/private key pairs have the property that for any given public key there exists one and only one private key, and vice versa. Public key cryptography (i.e., the ability to publicly distribute the encryption key) can be used to digitally sign documents. If a particular message can be decrypted using one member of the key pair, then the assumption is that the message must have been encrypted using the other member. If only one person knows the key used to perform the encryption of a document in the first place, then the recipients that can decrypt the document can be sure that the sender of the document must be that person.

However, for a digital signature to be meaningful, the recipient of an object signed with the digital signature must first be able to reliably determine the owner and integrity of the key used to sign the object. Public infrastructures accomplish this using an electronic document called a digital certificate. Certificates may contain information identifying the owner of the key pair, the public component of the pair, and the period of time for which the certificate is valid. The certificate may also identify technical information about the key itself, such as the algorithm used to generate the key, and the key length. Certificates are generated by organizations, companies, or enterprises that are responsible for verifying the identity of individuals (or in some instances organizations) to which certificates are issued. The certifying organization is known as a certificate authority. The certificate authority signs each certificate using a private key known only to the certificate authority itself. This allows users of the PKI to verify both the integrity of the certificate and the identity of the authority that issued it. By issuing a certificate, a certificate authority is stating that it has verified that the public key that appears in the certificate (and, by extension, the corresponding private key) belongs to the individual listed in the certificate. The integrity with which the registration process operates is, therefore, of great importance. The process must provide mechanisms for reliably identifying the individual and for verifying that the public key listed in the certificate belongs to that individual.

FIG. 1 shows a block diagram of an example PKI system architecture. Current PKIs that provide strong authentication of user identity accomplish this via the use of a local registration authority officer (LRAO) 12. LRAO 12 operates at a work station or server platform 14 that runs a local registration authority software application 16. Server platform 14 may be any known computing device that may serve as a server, e.g., computer, workstation, etc. The local registration authority application 16 interfaces to other server platforms that may contain applications such as a certificate authority application 18, a registration authority application 20, and/or a key recovery authority application 22. Each application may be on the same server platform, or on separate individual server platforms 14. A user 10, that is using or desires access to the PKI system architecture, accesses the system via a web browser 22 on a client platform 24. A hardware token 26, such as a smart card, may also be operably connectable to client platform 24. Typically in current systems, user 10 presents a photo I.D. to the local registration authority officer 12 in order to authenticate the user's identity. Local registration authority officer 12 then uses workstation 14 and local registration authority application 16 to signal a registration authority application 20 to register new user 10 in the system. Local registration authority application 16 may be off-the-shelf product software that comes typically bundled with a certificate authority application 18, registration authority application 20, and key recovery authority 22 software.

A public/private key pair is generated by either the local registration authority application 16 or the registration authority application 20 (depending on products chosen and depending on how they've been configured). The public key is sent to certificate authority application 18 to be signed, thereby, generating a certificate for new user 10. A backup copy of the private key may also be sent to key recovery authority application 22, however, normally the private key is kept on a token 26, or at client platform 24 by user 10. Once the public key is sent to a certificate authority 18 and signed, a user certificate is generated and provided to a local registration authority server. Local registration authority officer 12 copies the certificate (including the private key) onto a floppy disk, hardware token, or other storage medium, and then provides the certificate and private key to the user.

Different enterprises generally use different PKIs. For example, if enterprise-A wishes to grant access to a server that is part of enterprise-A PKI for a user from a different enterprise, e.g., enterprise-B, server A cannot authenticate the identity of the user from enterprise-B since the user from enterprise-B is not a part of enterprise-A's PKI, and presents a signature certificate from enterprise-B's PKI for authentication.

Currently, a process called cross-certification is used to enable multiple enterprises to coordinate certificates among enterprise specific PKIs. In current systems, a Certificate Authority from a first PKI signs the public key of a Certificate Authority from a second PKI. Similarly, the Certificate Authority from the second PKI signs the public key of the Certificate Authority from the first PKI. Now, when a user or server in the first enterprise PKI receives a signature certificate from a user from the second enterprise PKI, the user's signature certificate from the second enterprise PKI will be signed by the Certificate Authority from the first enterprise. Generally, a user or server from the first enterprise would not know if a signature certificate from a second enterprise can be trusted, since the signature certificate is from a different PKI. However, since the signature from the Certificate Authority from the second enterprise has itself been signed by the Certificate Authority from the first enterprise, the user and server from the first enterprise know that the Certificate Authority signature in the signature certificate from the second enterprise can be trusted.

However, current systems such as this are problematic in that they do not scale up well. For example, if there are N PKIs, then there are $N^2$ cross-certification signings that must be accomplished. Therefore, a need exists to allow a first enterprise to authenticate the identity of a user from a second enterprise within the first enterprise network.

SUMMARY

The present invention is directed to a method for cross directory authentication in a Public Key Infrastructure (PKI) that includes: configuring a first directory to query a second directory when receiving queries regarding signature certificates from a second enterprise PKI, where the first directory is part of a first enterprise PKI, and the second directory is part of the second enterprise PKI; attempting access to a server by a user, where the server is part of the first enterprise PKI, and the user presents a signature certificate from the second enterprise PKI to the server for authentication; sending a query to the first directory from the server to determine if the user is allowed access to the server; sending a query to the second directory from the first directory to determine if the user is a member of the second enterprise PKI; and signaling the server by the first directory that the user is allowed access to the server if the user is a member of the second enterprise PKI.

The present invention is also directed to a system for cross directory authentication in a Public Key Infrastructure (PKI). One or more servers are part of a first enterprise PKI. One or more client platforms are usable by one or more users to request access to the servers. A second directory contains information on users with a signature certificate for a second enterprise PKI. The second directory is part of the second enterprise PKI. A first directory sends a query to the second directory when receiving a query from a server regarding a signature certificate for the second enterprise PKI received at the server from a one user for authentication. The query from the server is sent to the first directory to determine if the user is allowed access to the server. The first directory is part of the first enterprise PKI. The query sent to the second directory from the first directory is sent to determine if the user is a member of the second enterprise PKI. The first directory signals the server that the user is allowed access to the server if the user is a member of the second enterprise PKI. The first directory and/or the server may configured with information regarding users with signature certificates from the second enterprise PKI that are allowed access to the server.

The present invention is further directed to an article comprising a storage medium having instructions stored therein, where the instructions when executed cause a processing device to perform: receiving configuration information that causes the processing device to send a query to a directory when receiving queries regarding signature certificates for a second enterprise PKI, where the processing device is part of a first enterprise PKI, and the directory is part of the second enterprise PKI; receiving a query from a server requesting if a user is allowed access to the server, where the server is part of the first enterprise PKI; sending a query to the directory to determine if the user is a member of the second enterprise PKI; and signaling the server that the user is allowed access to the server if the user is a member of the second enterprise PKI.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
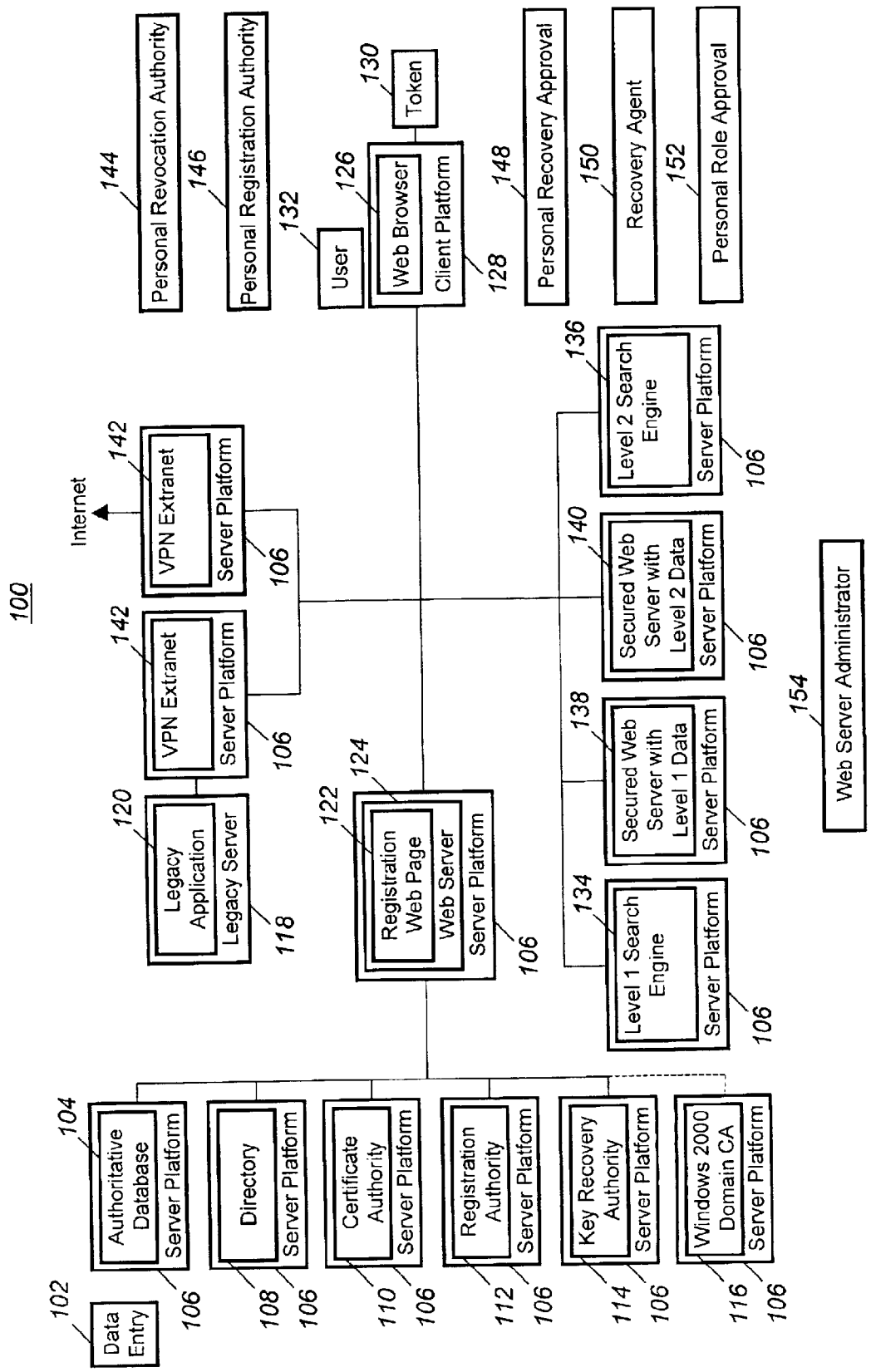
FIG. 2 is a block diagram of an exemplary system architecture in which PKI processes may be practiced according to an example embodiment of the present invention.

FIG. 2 shows a block diagram of an exemplary system architecture 100 in which Public Key Infrastructure (PKI) processes may be practiced according to an example embodiment of the present invention. The present invention is not limited to the system architecture 100 shown in FIG. 2. The boxes shown in FIG. 2 represent entities that may be hardware, software, or a combination of the two. The entities are operably connected together on a network. Entities not shown as being connected to the network represent one or more human beings that perform the function denoted inside the box.

System architecture 100 includes Data Entry 102 which performs a data entry function for Authoritative Database 104. Authoritative Database 104 is resident on server platform 106. A server platform 106 is referred to in this description but it should be understood that the present invention is not limited to any particular server architecture. Server platform 106 may be, for example, UNIX or Windows NT servers.

Authoritative database 104 contains information about members of the group or enterprise (e.g., company) for which PKI services in accordance with the present invention may be performed. The present invention is not limited by the structure of the group or enterprise for which information is stored in the authoritative database 104. The information contained in Authoritative database 104 may include, for example, the name, address, telephone numbers, manager's name, employee identification, etc., of the members of the group or enterprise. Directory 108 contains the same information contained in database 104, but is optimized for fast look-up of the information stored therein rather than fast data entry. The information contained in Directory 108 may be accessed faster than accessing the information from database 104. Directory 108 functions similar to an on-line quickly accessible phone book, containing reference information about the members of the group or enterprise stored in authoritative database 104.

Certificate Authority 110 may be conventional off-the shelf software executed on server platform 106. Certificate Authority 110 provides storage of certificates and related information. This will be described in more detail hereinafter. Registration authority 112 may also be off-the shelf software executable on server platform 106. Registration authority 112 will also be described in more detail hereinafter. Key recovery authority 114 may also be off-the shelf server software executable on Server Platform 106, and may provide the function of recovering keys (e.g., archived or lost keys) for members of the group or enterprise.

A Windows 2000 Domain Certificate Authority (CA) 116 is shown with a dotted line connection to the network and may or may not be part of a system according to the present invention. Windows 2000 is able to use PKI certificates for network single sign-on, but Windows 2000 is designed to use only the Windows Certificate Authority Windows. Therefore, a system according to the present invention may include a conventional Certificate Authority 110 as well as a 2000 Domain CA 116.

Legacy server 118 executes legacy application programs 120. Legacy server 118 may be, without limitation, a main frame, mini-computer, workstation or other server capable of hosting legacy software applications. Legacy software applications generally may not be designed to be inherently interoperable with a PKI. Legacy applications 120 may be accessible on the client side by a custom client 128 such as an emulator or custom database Graphic User Interface (GUI). Examples of emulators are terminal emulators of an IBM 3270 or terminal emulators of a vt100.

Figure 1:
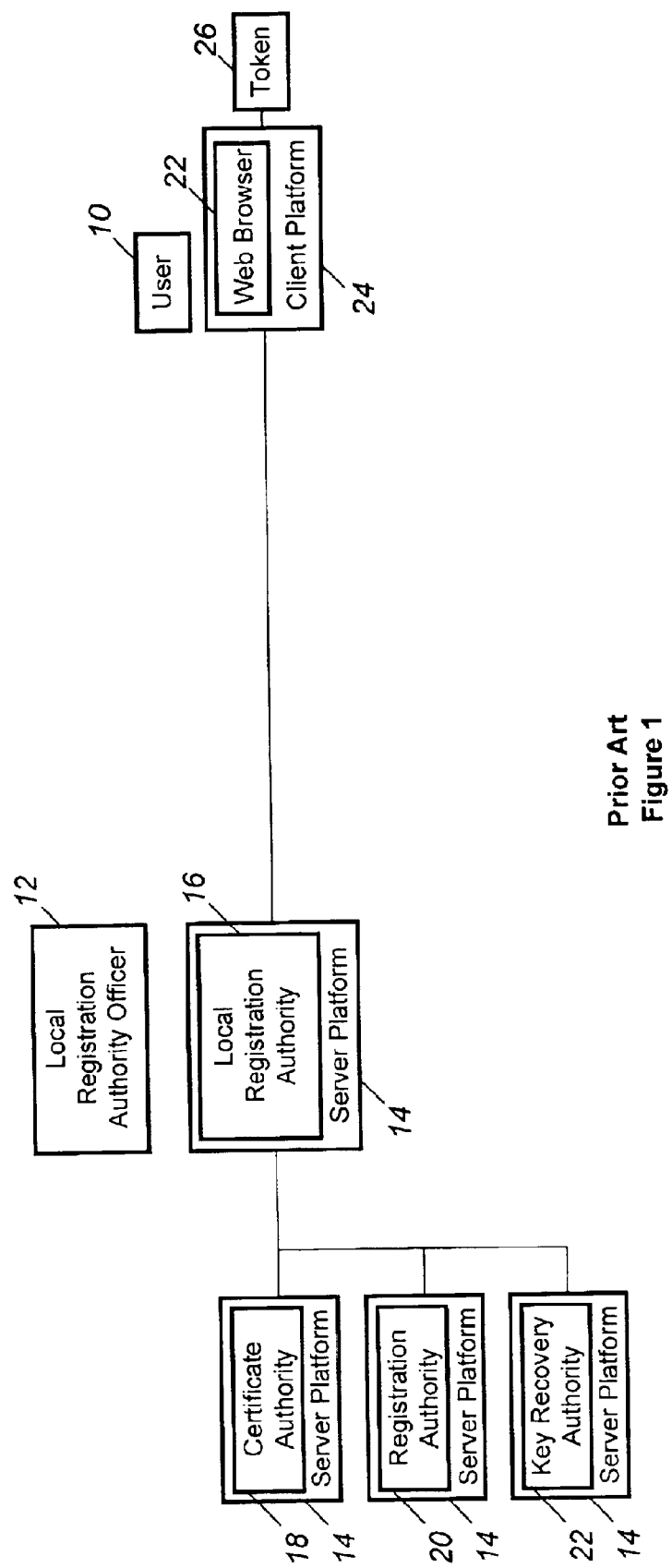
FIG. 1 is a block diagram of an example PKI system architecture.

Registration web page 122, which may be one or more pages, functions as the user interface to system architecture 100 shown in FIG. 1. Web Server 124 is a software application that serves Web Pages (such as web page 122) or other HTML outputs to a web browser client (such as web browser 126). Web Server 124 may be any software application that serves Web Pages or HTML outputs such as, for example, Apache, Microsoft Internet Information Server application, etc.

Web browser 126 is resident on client platform 128 which may be any user computer or computing device. Web browser 126 may be a client software application for browsing web pages such as, for example, HTML protocols, XML protocols, or other protocols. Web browser 126 may be programmed to operate with PKI certificates issued by certificate authority 110. Examples of web browsers which have this capability include Netscape Navigator and Microsoft Internet Explorer. The token 130 may be a smart card, a device with a Universal Serial Bus (USB), or other hardware token device capable of generating, storing, and/or using PKI certificates.

A user 132 is a person that uses or desires access to system architecture 100. User 132 may transition through a number of states which include, for example, a new user, a current user, and a former user. A former user is no longer a member of the group or enterprise. System architecture 100 is described with reference to two levels of security with each level corresponding to a different security requirement. The number of the levels of security is not a limitation of the present invention. The level 1 search engine 134 may be a search engine that is permitted to search system architecture 100, but is allowed access to only level 1 data which is the lowest level of security. Level 1 data may be, for example, data which is freely distributable whereas level 2 data may be considered to be proprietary. A Level 2 search engine 136 may be a search engine which is allowed to search both level 1 and level 2 data. A Level N search engine (riot illustrated) may be a search engine which is allowed to search through servers possessing Levels 1 through N data.

A secured level server with Level 1 data may be a web server containing only level 1 data that is secured so that users may need to have level 1 access (at least) to access the level 1 servers. A secured web server with level 2 data 140 may be a web server that contains level 2 data that has been secured so that users must have at least level 2 access to access the level 2 servers. A user with level 2 access may have access to both level 1 and level 2 servers. A secured web server with level N data (not illustrated) is a web server that contains level N data which is accessible by users with level N or above. Users with level N or above access may have access to all levels of data up through level N data.

VPN Extranet 142 may be a software application which functions as a network gateway, which as illustrated, may be either to legacy server 118 and legacy application 120 or to an external network such as the Internet. Personal revocation authority 144 may be one or more people that are in charge of revocation of members from system network 100. Personal registration authority 146 may be one or more people that are in charge of registration of members in system network 100. Personal recovery approval 148 may be one or more people that are in charge of obtaining recovery of certificates. A Recovery Agent 150 may be one or more people that perform recovery of certificates and may only recover a certificate if the certificate has first been designated as recoverable by another person. Personal role approval 152 may be one or more people that approve different role functions within the system network 100. A web server administrator may be one or more people that are in charge of various web functions in system network 100.

The present invention relates to systems and methods for cross-directory authentication where a directory in a first enterprise PKI receives a queries related to users with signature certificates from a second enterprise PKI. The directory in the first enterprise is configured to query a directory in the second enterprise PKI to validate the user from the second enterprise. The directory in the first enterprise PKI (enterprise A) may have been provided a directory entry for users from the second enterprise PKI (enterprise B) that may access one or more servers of the first enterprise PKI. A server that is part of the first enterprise PKI may contain data that is somewhat proprietary to the first enterprise, but may have a non-disclosure agreement with enterprise B for some particular project which has data hosted on a server (server A) from enterprise A. Therefore, users from enterprise B may need access to the data on server A which is part of enterprise A.

Since different enterprises generally use different PKIs, if enterprise A wishes to grant access to one or more of its servers to a user from enterprise B, once the user from enterprise B requests access to a server from enterprise A, the server from enterprise A sends a query to a directory of enterprise A (directory A) to authenticate the identity of the user from enterprise B. Since the directory at enterprise A may include a directory entry for users from enterprise B that may need access to a server in enterprise A, directory A is programmed to query a directory from enterprise B (directory B) for all queries received by directory A related to users in enterprise B. Directory B determines if the user is still a member of enterprise B and if so, replies to the query from directory A that user B is allowed access to the server of enterprise A. Directory A may also be configured with all users allowed access to servers in enterprise A and, therefore, even though the user from enterprise B is a member of enterprise B, this user may not be listed in directory A as having access to a particular server of enterprise A, and thus may be denied access to the particular server.

Figure 3:
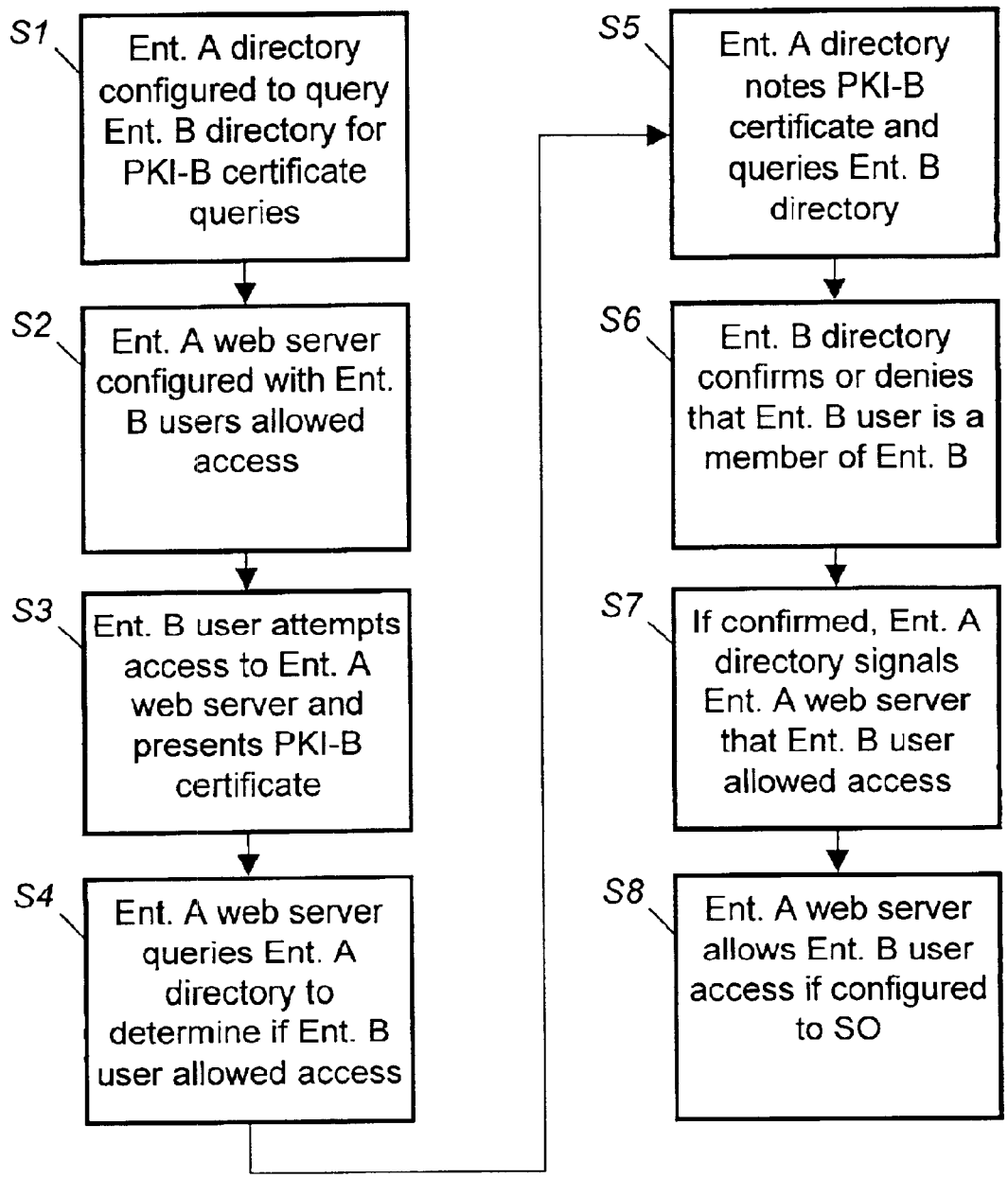
FIG. 3 is a flowchart of an example process for cross directory authentication in a public key infrastructure according to an example embodiment of the present invention.

FIG. 3 shows a flowchart of an example process for cross-directory authentication according to an example embodiment of the present invention. A directory in enterprise A may be configured to query a directory in enterprise B when receiving enterprise B PKI signature certificate queries S1. An enterprise A web server may be configured with enterprise B users (with enterprise B PKI signature certificates) that are allowed access to the enterprise A web server S2. A user from enterprise B attempts access to the enterprise A web server and presents a PKI certificate from enterprise B, S3. The enterprise A web server queries the enterprise A directory to determine if the user from enterprise B is allowed access to the server S4. Enterprise A directory notes that the user has a signature certificate from an enterprise B PKI and thus queries a directory in enterprise B to authenticate the user from enterprise B S5. The enterprise B directory determines if the user is a member of enterprise B and confirms or denies that the user is a member of enterprise B, S6. The enterprise B directory signals the enterprise A directory accordingly. If the user is confirmed, the enterprise A directory signals the enterprise A web server that the user from enterprise B is allowed access to the server S7. The enterprise A web server then allows the user from enterprise B access if the web server from enterprise A is also configured to allow the user from enterprise B access to this web server S8.

Systems and methods for cross directory authentication according to the present invention are advantageous since they are less complicated than current processes for cross-PKI certification. The current invention is also advantageous in that even in the case of a totally comprised PKI for enterprise B, the present invention only allows access to data on a mutually shared server. Data that resides on a server maintained by only one of the two enterprises remains secure.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for cross directory authentication in a Public Key Infrastructure (PKI) comprising:

configuring a first directory to query a second directory when receiving queries regarding signature certificates from a second enterprise PKI, the first directory being part of a first enterprise PKI, the second directory being part of the second enterprise PKI;

configuring the first directory with information regarding users with signature certificates associated with the second enterprise PKI that are allowed access to the server;

attempting access to a server by a user, the server being part of the first enterprise PKI, the user presenting a signature certificate from the second enterprise PKI to the server for authentication;

sending a query to the first directory from the server to determine if the user is allowed access to the server;

sending a query to the second directory from the first directory to determine if the user is a member of the second enterprise PKI; and signaling the server by the first directory that the user is allowed access to the server if the user is a member of the second enterprise PKI.

2. The method according to claim 1, further comprising configuring the first directory by a network administrator.

3. The method according to claim 1, further comprising configuring the server with information regarding users with signature certificates from the second enterprise PKI that are allowed access to the server.

4. The method according to claim 1, further comprising configuring the server by a network administrator.

5. A system for cross directory authentication in a Public Key Infrastructure (PKI) comprising:

at least one server, the at least one server being part of a first enterprise PKI;

at least one client platform, the at least one client platform usable by at least one user to request access to the at least one server;

a second directory, the second directory containing information on at least one user with a signature certificate for a second enterprise PKI, the second directory being part of the second enterprise PKI; and a first directory, the first directory sending a query to the second directory when receiving a query from at least one server regarding a signature certificate for the second enterprise PKI received at the at least one server from at least one user for authentication, the query from the at least one server sent to the first directory to determine if the at least one user is allowed access to the at least one server, the first directory being part of the first enterprise PKI and including a directory entry that includes users with signature certificates from the second enterprise PKI that are allowed access to the server, the query sent to the second directory from the first directory being sent to determine if the at least one user is a member of the second enterprise PKI, the first directory signaling the at least one server that the at least one user is allowed access to the at least one server if the user is a member of the second enterprise PKI.

6. The system according to claim 5, wherein the first directory comprises a database.

7. The system according to claim 5, wherein the second directory comprises a database.

8. The system according to claim 5, wherein the at least one server, the at least one client platform, and the first directory are operably connected via a network.

9. An article comprising a storage medium having instructions stored therein, the instructions when executed causing a processing device to perform:

receiving configuration information that causes the processing device to send a query to a directory when receiving queries regarding signature certificates for a second enterprise PKI, the processing device being part of a first enterprise PKI, the directory being part of the second enterprise PKI;

receiving a query from a server requesting if a user is allowed access to the server, the server being part of the first enterprise PKI and including a directory entry including users with signature certificates from the second enterprise PKI that are allowed access to the server;

sending a query to the directory to determine if the user is a member of the second enterprise PKI; and signaling the server that the user is allowed access to the server if the user is a member of the second enterprise PKI.

* * * * *